United States Patent
Callas

(10) Patent No.: US 7,657,037 B2
(45) Date of Patent: Feb. 2, 2010

(54) APPARATUS AND METHOD FOR IDENTITY-BASED ENCRYPTION WITHIN A CONVENTIONAL PUBLIC-KEY INFRASTRUCTURE

(75) Inventor: Jonathan D. Callas, San Jose, CA (US)

(73) Assignee: PGP Corporation, Palo Alto, CA (US)

( * ) Notice: Subject to any disclaimer, the term of this patent is extended or adjusted under 35 U.S.C. 154(b) by 648 days.

(21) Appl. No.: 11/232,419

(22) Filed: Sep. 20, 2005

(65) Prior Publication Data

US 2007/0199071 A1  Aug. 23, 2007

Related U.S. Application Data

(60) Provisional application No. 60/611,586, filed on Sep. 20, 2004.

(51) Int. Cl.
*H04L 9/08* (2006.01)
(52) U.S. Cl. .......................... 380/284; 713/171
(58) Field of Classification Search ................ 713/170, 713/172, 173, 174, 175, 169; 380/284, 285, 380/281, 277, 278; 726/26
See application file for complete search history.

(56) References Cited

U.S. PATENT DOCUMENTS

| | | | |
|---|---|---|---|
| 6,886,096 B2* | 4/2005 | Appenzeller et al. | 713/170 |
| 7,003,117 B2* | 2/2006 | Kacker et al. | 380/277 |
| 7,017,181 B2* | 3/2006 | Spies et al. | 726/3 |
| 7,103,911 B2* | 9/2006 | Spies et al. | 726/3 |
| 7,113,594 B2* | 9/2006 | Boneh et al. | 380/28 |
| 7,181,472 B2* | 2/2007 | Cameron et al. | 707/201 |
| 2003/0081785 A1* | 5/2003 | Boneh et al. | 380/277 |
| 2003/0179885 A1 | 9/2003 | Gentry et al. | |
| 2004/0098589 A1 | 5/2004 | Appenzeller et al. | |
| 2004/0151308 A1 | 8/2004 | Kacker et al. | |
| 2004/0179684 A1 | 9/2004 | Appenzeller et al. | |
| 2005/0246533 A1* | 11/2005 | Gentry | 713/170 |
| 2007/0041583 A1* | 2/2007 | Boneh et al. | 380/28 |

OTHER PUBLICATIONS

Gene Tsudik and Xuhua Ding Simple Identity-Based Cryptography with Mediated RSA, The Cryptographers' Track at the RSA Conference 2003, San Francisco, CA, pp. 192-209 (Apr. 13-17, 2003).*
International Search Report mailed Jun. 4, 2007 and International Preliminary Report on Patentability and Written Opinion mailed Jul. 19, 2007 for International Application No. PCT/US05/34084, 7 pages.

* cited by examiner

*Primary Examiner*—Eleni A Shiferaw
(74) *Attorney, Agent, or Firm*—Cooley Godward Kronish LLP

(57) ABSTRACT

A computer readable medium storing executable code to generate an identity-based encryption key includes executable code to specify a master key, receive an identity-based string and execute a function that processes the master key and the identity-based string to produce a seed. The seed is then used to produce an identity-based encryption key interoperable with a deployed public key cryptosystem.

10 Claims, 2 Drawing Sheets

APPARATUS AND METHOD FOR IDENTITY-BASED ENCRYPTION WITHIN A CONVENTIONAL PUBLIC-KEY INFRASTRUCTURE

CROSS REFERENCE TO RELATED APPLICATIONS

This application claims the benefit of U.S. Provisional Application No. 60/611,586, entitled "Identity-Based Encryption with Conventional Public-Key Cryptography," filed on Sep. 20, 2004, the disclosure of which is incorporated herein by reference in its entirety.

BRIEF DESCRIPTION OF THE INVENTION

This invention relates generally to digital data security. More particularly, this invention relates to identity-based encryption within a conventional public-key infrastructure.

BACKGROUND OF THE INVENTION

Conceptually, public keys behave a lot like telephone numbers—if I want to call you, I need your telephone number. I don't need my own number to make calls (I can use a pay phone, for example); I need a number to receive calls. In a fashion that is analogous to a telephone number, I need your public key to encrypt something so that it is secret to you.

Unlike telephone numbers, public keys are far too big for people to remember. Even elliptic curve keys, which are much shorter than the traditional ones are far too large for a person to remember. A 160-bit key is over 40 digits long (exactly 40 if one uses hexadecimal). So memorizing someone's key the way one memorizes a phone number is completely out of the question.

Consequently, we need to have blobs of data that say that a name such as alice@example.com belongs to some key. There is also value in digitally signing the data so that the receiver has some assurance that the association is accurate. These blobs are certificates.

Like any data management problem, certificate management is harder than people would like. This is why in 1984 Adi Shamir suggested the idea of coming up with a crypto scheme in which any string can be a public key See, A. Shamir, *Identity-based Cryptosystems and Signature Schemes*, Proceedings of CRYPTO '84, LNCS 196, pages 47-53, Springer-Verlag, 1984. Thus, there is no need to associate a name with a public key, because they're effectively the same. This is Identity-Based Encryption (IBE).

While we typically think of IBE systems converting names into public keys, it should be possible to make any arbitrary bit-string, ID $\in \{0,1\}^*$, a determinant of a public key in an IBE system. Thus, a name, an email address, or even a binary object such as a picture or sound can be considered equivalent to a public key. Thus, an IBE system can be thought of as a function of the form $K_i = IBE(ID_i)$ that produces keys from arbitrary bit strings that we call identities, without loss of generality.

An IBE system contains four basic components in its construction:
1. System Setup: IBE systems rely upon a trusted central authority that manages the parameters with which keys are created. This authority is called the Private Key Generator or PKG. The PKG creates its parameters, including a master secret $K_{pkg}$ from which private keys are created.

2. Encryption: When Bob wishes to encrypt a message to Alice, he encrypts the message to her by computing or obtaining the public key, $P_{Alice}$, and then encrypting a plaintext message M with $P_{Alice}$ to obtain ciphertext C.

3. Key Extraction: When Alice wishes to decrypt the message C that was encrypted to her name, she authenticates herself to the PKG and obtains the secret key $S_{Alice}$ that she uses to decrypt messages.

4. Decryption: When Alice has C and $S_{Alice}$, she decrypts C to obtain the plaintext message M.

No matter the specific parameters or requirements of the system, these functional aspects are always present in IBE systems as their defining components.

All of the existing IBE systems have their own limitations. One system signs but does not encrypt. Another system needs care to avoid an adaptive chosen ciphertext attack. While other systems have proofs of security, there is a notoriously poor relationship between proofs of security and actual system security. Security proofs can show where a system is safe, but not protect against new assumptions that an adversary can bring to bear against the system nor against uses of a system that its creators did not think of which may be outside of the scope of the original threat model. Still other subtle problems have shown up on other systems, such as the ability for colluding users to determine the PKG's master key.

With the exception of Shamir's system, IBE systems rely on new public-key cryptosystems, most often Weil pairing. Consequently, they are not compatible with existing systems that use RSA (the Rivest-Shamir-Adleman algorithm), Elgamal, or DSA (Digital Signature Algorithm). This limits their practical application, since there are many existing systems built upon these cryptosystems. Also, experience and comfort with the security of these established systems is high. A key advantage that Shamir's system has over all those that follow it is that it was based on established public key cryptography, and thus (had it been successful in being both a signing and encrypting system) is interoperable with non-IBE systems. Had Shamir s system been successful at encrypting, an RSA-based IBE system would likely be the dominant IBE system today, if for no other reason than its interoperability with deployed systems. This is an important observation—if one can construct an IBE system that uses traditional, integer-based, public key cryptography, the barriers to adoption of IBE systems might be lowered. The value that IBE has can be fully realized if it can be made to work with these established systems. Working with established systems has the advantage of relying on twenty years of mathematical and operational familiarity associated with these traditional public-key cryptosystems.

Previous IBE systems have as a desirable property that they support off-line generation of keys. That is to say, one receives key-generation parameters from the PKG once, and can then generate an arbitrary number of public keys. Off-line generation is ideal in an off-line environment. If communication with the PKG is slow, expensive, or unreliable, then off-line generation is a huge advantage to its users. They need only one interaction with a given PKG to be able to do all needed work with that server.

This advantage becomes less significant as communication with a PKG becomes cheaper, easier, and faster. On some level, off-line key generation is nothing more than a key server that is an algorithm instead of a database. This is an advantage when databases are static and expensive, but not when databases are cheap and fast. In an environment where the contents of the database are dynamically changing, a database change is not only an algorithm change, but an algorithm change that must be propagated to all clients of the PKG.

Oftentimes, the strengths of a system are also its weaknesses. This is also true with off-line generation. Off-line generation makes key generation easy not only for legitimate users of the system but for illegitimate ones as well. An issue that PKIs must consider in their design is that of a Directory Harvest Attack, in which senders of unwanted advertisements or outright fraudulent confidence games use the directory as a way to discover information paths into the system. Off-line generation of keys allows spammers and other attackers to pre-generate email attacks in their own system or create a distributed system for encrypted attacks. These attacks are not an issue in off-line systems. Off-line generation has the disadvantage that there is complete transparency in the directory, since the directory is an algorithm. Anyone with that algorithm has all possible entries in the directory and their public keys, and this can be exploited in side-channel attacks that are not attacks on the cryptographic system per se, but the way the system is used.

Off-line generation has as an additional disadvantage of increased revocation problems. A conventional PKI must be able to re-issue certificates and handle revisions in the PKI. An off-line IBE system must not only handle revocation of the certificates themselves but a revocation of the algorithmic parameters that comprise its own PKI. No IBE system has even considered this real-world problem.

In view of the foregoing, it would be desirable to develop an improved IBE system that overcomes the shortcomings associated with prior art IBE systems.

SUMMARY OF THE INVENTION

The invention includes a computer readable medium storing executable code to generate an identity-based encryption key. The executable code includes executable code to specify a master key; receive an identity-based string; execute a function that processes the master key and the identity-based string to produce a seed; and use the seed to produce an identity-based encryption key.

The invention also includes a computer readable medium storing executable code to generate an identity-based encryption key, where the executable code includes executable code to produce an identity digest token that is a function of a master key and an identity-based string; and seed a random number generator with the identity digest token to produce an identity-based encryption key.

The invention also includes a method of generating an identity-based encryption key. The method includes specifying a master key; receiving an identity-based string; executing a function that processes the master key and the identity-based string to produce a seed; and using the seed to produce an identity-based encryption key.

The invention provides for Identity-Based Encryption (IBE), while still being compatible with conventional public-key cryptosystems. As an on-line system, the invention avoids the security problems associated with other IBE systems that permit off-line key generation. Consequently, the invention has the advantages of an IBE system—that any bit string be equivalent to a public key, without the disadvantages of permitting an attacker complete knowledge of the PKG.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Identity-Based Encryption (IBE) can also be thought of as an Attribute-Based Enrollment mechanism. Its goal is to reduce the overhead required to bring an entity into the system. The overhead is reduced by taking some attribute of the entity and use that attribute as a functional equivalent to a public key. An embodiment of the invention is directed toward the enrollment aspect of IBE. This enrollment mechanism results in many of the advantages associated with the invention. The invention constructs an IBE from well-known components that have easily-understood security constraints, including proofs of security. Thus, the invention provides an adaptive framework for constructing an IBE system that is not bound to a single algorithm and is functional even in the face of security advances such as new attacks on hash functions.

Figure 1:
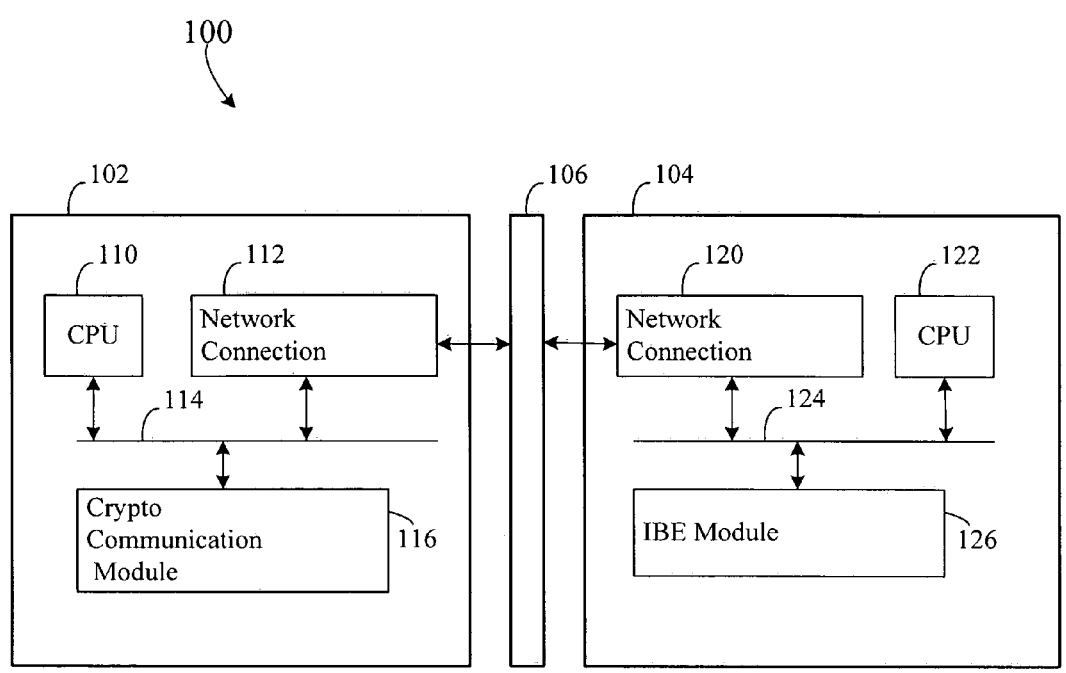
FIG. 1 illustrates a network configured in accordance with an embodiment of the invention.

FIG. 1 illustrates a network 100 configured in accordance with an embodiment of the invention. The network 100 includes a client computer 102 connected to a server computer 104 via a communication channel 106, which may be any wired or wireless communication channel. The client computer 102 includes standard components, such as a central processing unit 10 connected to a network connection circuit 112 via a bus 114. A cryptography communication module 116 is stored in a memory connected to the bus 114. The cryptography communication module 116 includes executable code to coordinate the encryption and decryption of messages sent and received by the computer 102. The cryptography communication module 116 includes executable code to access and interoperate with the server computer 104.

The server computer 104 also includes standard components, such as a network connection circuit 120, a central processing unit 122, and a bus 124. An IBE module 126 is stored in a memory connected to bus 124. The IBE module includes executable instructions to implement operations associated with the invention. In particular, the executable instructions facilitate identity-based encryption operations within a conventional public key infrastructure, as discussed below. The IBE module 126 may also be resident on client computer 102 or any other computer within a network. The location of the IBE module 126 is insignificant, only the functions that are performed by the module are noteworthy.

Figure 2:
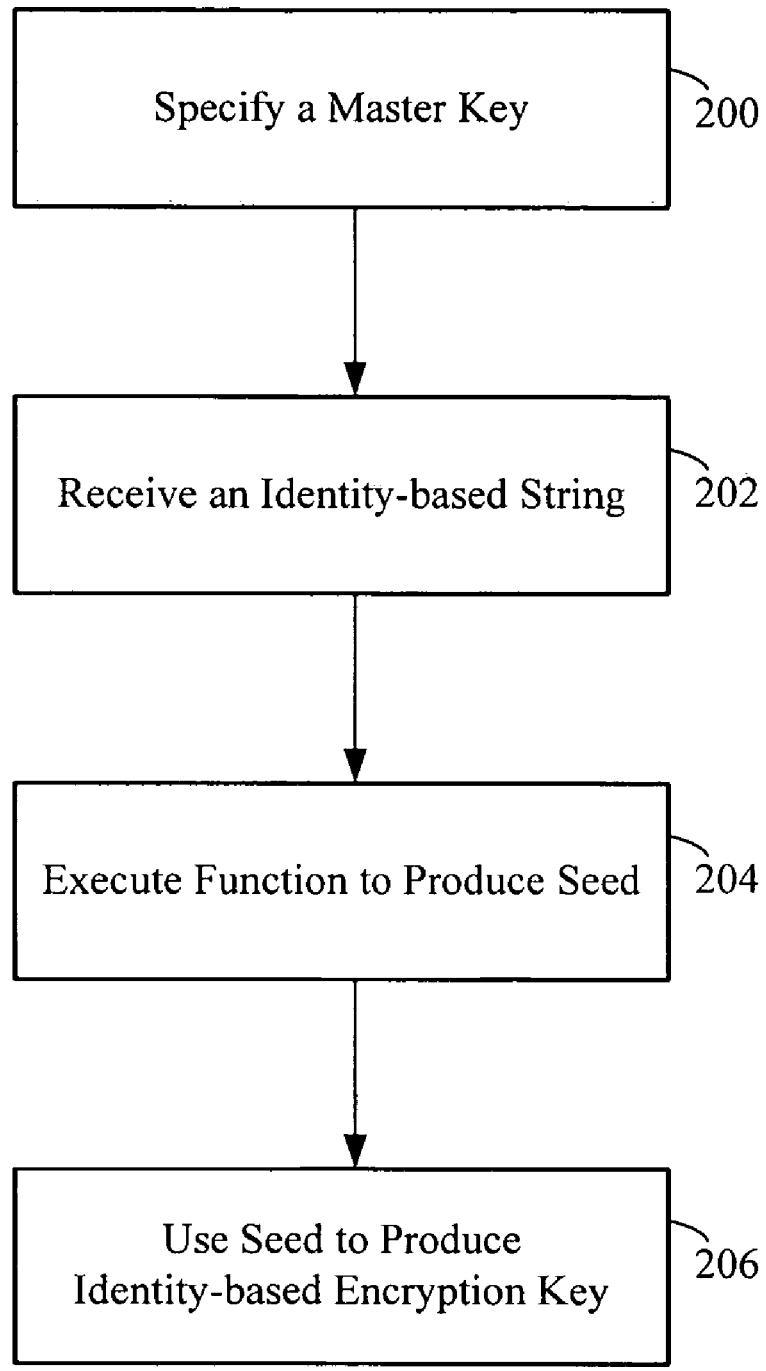
FIG. 2 illustrates processing associated with an embodiment of the invention.

FIG. 2 illustrates processing operations implemented by an IBE module 126 of the invention. Executable code associated with the IBE module 126 specifies a master key 200, as discussed in more detail below. An identity-based string is then received 202. Typically, the identity-based string will come from a client computer, such as client computer 102, and will specify an attribute (e.g., email address) of a user of the client computer. Various forms of identity-based strings are processed or formed in accordance with embodiments of the invention, as discussed below. A function is then executed to process the master key and the identity-based string to produce a seed 204. The executable code of the IBE module 126 may include various instructions to implement various functions, as discussed below. The seed is then used to produce an identity-based encryption key 206. Again, the executable code of the IBE module 126 may include various instructions to implement various functions to process the seed and produce an identity-based encryption key, as discussed below.

The IBE module 126 may form a part of or operate in conjunction with a PKG. In one embodiment of the invention, setting up the PKG includes the following steps:

1. The PKG selects a master key, $K_{pkg}$. This key is selected with care, as the security of the underlying system can be no more than the security inherent in this key. This key may be a symmetric key or an asymmetric key.
2. The PKG selects an Identity Digest Function, IDF. This is a pseudo-random bit function of the identity, ID, and $K_{pkg}$ that gives an Identity Digest Token, IDT such that IDT=IDF($K_{pkg}$, ID).

The IDF can be a symmetric-cryptographic function using the $K_{pkg}$ as some simple secret. For example, it could be an HMAC (Key Hashed Message Authentication Code), a CBC-MAC, or some other suitable pseudo-random bit function. The IDF may also be an asymmetric-cryptographic function such as RSA, in which case $K_{pkg}$ might be an appropriately strong RSA key and IDT is thus the result of an RSA encryption of either ID directly or a hash of ID. Note that in this and similar cases, padding must be considered carefully to preserve the needed determinism of the IDF as it establishes a one-to-one correspondence between ID and IDT. Without a one-to-one correspondence, then this is not an IBE system.

It may be desirable for this selection to be part of the setup; the PKG could be built with a number of options of IDF, one selected at setup time. Regardless of IDF selection, the resultant IDT is a limitation on the security of the IBE keys. If, for example, it were the CBC-MAC of a block cipher with a 64-bit block, then the underlying system has a birthday attack on the IDT that is probably less than the other parameters of the system. Selecting the IDF requires analysis of the overall system to avoid a security bottleneck of the system.

3. The PKG selects a deterministic pseudo-random number generator (RNG) that will be seeded with IDT. This RNG is not the same function as IDF as it will in turn be used by a key generation function, Kgen, that generates an IBE key pair. This would be an RSA, DSA, Elgamal, or other key generation function. Of course, the PKG must be deterministic, as the same key must be generated any time a given identity is submitted the system.

This construction has advantages beyond the simplicity of being able to use any key type within an IBE system. The security of the system relies on previously-studied components, which provides for easier security analysis. It also implicitly guards against some forms of attacks, such as collusion attacks. Breaking the $K_{pkg}$ is as hard as breaking known forms of cryptography. So long as a suitable IDF function is selected, the whole Kgen process is as secure as its underlying cryptographic subsystems.

When the PKG is requested for a key for a given ID, it follows the following process:

1. The PKG produces an IDT, such that IDT=IDF ($K_{pkg}$, ID).
2. The PKG seeds RNG with IDT.
3. The PKG generates a key with Kgen (RNG) to produce the appropriate IBE key pair, $IKP_{ID}$.
4. If the PKG has an unauthenticated request for the given ID, then it responds with $IKP_{IDpublic}$. For example, this happens when Bob asks for Alice's key.
5. If the PKG has an authenticated request for ID, such as when Alice asks for her own key, then the PKG responds with both $IKP_{IDpublic}$ and $IKP_{IDprivate}$.

At this point, Alice and Bob each have the appropriate piece (s) of a conventional key pair and they use it normally.

Given the foregoing enrollment process, encryption and decryption are trivial. They are simply the encryption and decryption functions of the base cryptosystem of the IBE keys. Note that if the cryptosystem is a signature-based cryptosystem such as DSA, it is signing and verification rather than encryption and decryption.

The online nature of the invention provides a number of benefits. Trends in the real world make the advantages of off-line IBE moot, and turns its disadvantages into outright security problems. There is little need for off-line generation in an on-line world, and the advantages of off-line generation benefit attackers more than defenders.

Nonetheless, IBE has desirable characteristics. The core IBE concept, that there is an equivalence relationship between bit-strings and keys has appeal. Designing an IBE system that has the advantages of name-to-key mapping without the security flaws of off-line key generation can make IBE acceptable to the complex security requirements of the Internet.

Furthermore, if we shift the IBE system to an on-line system, we can construct it so that it uses traditional keys. This permits an IBE system to be embedded within an existing cryptosystem and interoperable with existing systems that use these keys. Not only does this remove adoption issues, but it also simplifies proofs of security; it is trivial to prove that an encryption portion of an IBE system is as secure as RSA if the underlying encryption is RSA.

Another advantage is that an on-line system can normalize the identity. It is common for users of an email system to have equivalent identities on the system. For example alice@example.com and asmith@example.com may be the same user, and it is desirable to have only one key. An on-line system can canonicalize identities at runtime.

Finally, and perhaps counter-intuitively, this permits IBE keys to be used in certificates. We usually think of IBE as a way to eliminate certificates. However, all keys require standard data structures for transport. Whatever flaws they have, certificates are existing, standard ways to format key material in a way that systems can reliably use them. Objections to certificate-based systems are not objections to the certificates per se, but to the certification process. Without a standard set of transport data structures, IBE proponents must standardize on key transport data structures and convince developers to use those structures as well as the new crypto algorithms and protocols. Using existing certificate systems reduces the Key Extraction problem to an existing problem that has a simple solution, e.g. a lookup in a directory.

Combining certificates with IBE is not new. It is known to combine forms of certificates with Weil pairings. On-line systems are ubiquitous and becoming more available every day. Consequently, the advantage of off-line key generation in an IBE system not only has less value today than it did when Shamir first suggested IBE in 1984, but new attacks turn it into a boon for the attacker of a system. Relaxing the parameters of an IBE system so that Bob is required to ask the PKG for each key is certainly practical, and permits one to exploit other desirable system features.

As with all IBE systems, there are a number of security limitations associated with the invention, such as the key escrow problem, security key generation, and security key extraction. However, in all these cases the limitations of this system are no different than for other IBE systems.

The key escrow problem refers to the fact that IBE systems are effectively key escrow systems. It is a limitation, if not an outright flaw of IBE that the PKG holds all the parameters needed to generate any key pair, if not the key pair itself. Consequently, Bob can never be completely assured that Alice and only Alice can decrypt a message or created a signature. In the real world this is less of a problem than it is in theory, as the security of Alice's secret key is always bounded by the operational parameters of her key storage. It is undeniable, however, that an RSA key generated on a secure token is going to be more secure than one generated in a PKG. IBE systems, including this one, may be unacceptable for some uses. If there is a legal requirement that Alice's private half of her signing key be in her possession alone, then no IBE signing system will be acceptable. One partial solution to this problem is to split the master key using a secret-sharing system. This has the advantage that no single entity has any of the core secret parameters. An adversary would have to compromise enough members of a set of PKGs to reconstitute the secret. Nonetheless, this is only a partial solution. At some point, the set of PKGs must reconstitute the parameters, and an adversary that sufficiently compromises the appropriate member can still get the parameters. Furthermore, since the members of the PKG set are likely to be close to identical, they are not independent in their security. If an adversary can compromise one member of the set, it is more possible if not likely that the adversary can compromise the whole set.

Another solution would be to keep the master parameters in secure hardware, or even secret-shared across a set of pieces of secure hardware. But this adds complexity on top of complexity to the system.

In the current invention, the IBE parts of the system are by necessity a key escrow system, but note that it can fully interoperate with another other PKI that is not a key escrow system. Furthermore, this system can be integrated with a more secure public key system to provide it with IBE features. For example, the IBE in this system gives a way that keys can be created for roles such as Security Officer or Ombudsman without pre-defining these roles or their owners prior to use. This is another advantage to merging IBE aspects into conventional PKI. Within a given PKI, one can have parts of it that are IBE-derived, and parts that are fully-secure, edge-generated public key pairs. Moreover, they all interoperate seamlessly.

The security of the keys generated by the PKG are bounded by the selection of the underlying functions as well as the scale of the PKG. If the PKG is to generate many, many keys, then factors such as the possibility of identity collision have to be taken into account as well. This is not an intractable problem—there are many underlying functions that can be used for components of the PKG that have adequate security parameters for security. It must simply be noted that these are security design factors that are unique to an IBE system.

Secure key extraction is another issue to consider. When Alice extracts her private key from the PKG, the PKG must deliver it to her securely. There are many ways to do this, including secure network connections. It also must be packaged securely (and this is another place where existing data structure systems such as certificate standards gain help). This is again, not precisely a security problem but more of where the PKG builders must take care in their delivery system.

IBE is not yet a mature discipline. There are a number of open problems beyond improving the security of the underlying system that are yet to be solved. The following discussion addresses existing IBE security issues and measures to minimize those security issues in accordance with embodiments of the invention.

The whole raison d'être for IBE is to "solve" the certificate problem. However, this means that IBE assumes that it is possible for a certificate to consist solely of a name and a key. In the real world, certificates have always been more than a mere binding between a name and a key; they also carry metadata about the name, the key, parameters of use, and even metadata about the metadata.

One of the most important bits of metadata about a key is revocation data. If a name is a key, then it is not possible to revoke the key without revoking the name as well. The utility of Alice not having to have a certificate is small if she must revoke her email address if she loses a smart card. Furthermore, telling everyone who has Alice's email address that they must use her new one (and thus new key) is precisely a key revocation problem with added disadvantages for Alice.

One solution to this problem is to specify that IDAlice not be "alice@hotmail.com" but "alice@hotmail.com||2004". In fact, the PKG can create various temporal keys, such as daily-use keys, e.g., "alice@hotmail.com||Feb. 29, 2004". As elegant as this solution is, it prompts other questions. Once an identity is not simply a name, but is now a name and a date, is it still Identity-Based Encryption? Phrased another way, isn't "alice@hotmail.com||2004" merely a different way to code a certificate?

Implementing this solution also requires other surrounding standardization that detracts from the essential simplicity of the IBE concept. At this simplest form, one must standardize on what a date is. One must also translate malformed dates (perhaps "2 Février 2004" into "02/02/2004:12:00:00.00UTC+0100"), which again detracts from the simplicity of IBE, as this is no longer something that a human being can reliably type the way that they can reliably type "alice@hotmail.com". However, this is a problem that can be solved through software, and one where an on-line system has an advantage as it can canonicalize time in a central place, or even round to an internal epoch.

There was a previous discussion of the algorithmic revocation problem. No IBE system before the present invention is believed to have considered how the IBE parameters, the IBE algorithm itself, can be revoked. The fact that IBE is brittle in its reliance on central secrets makes this a larger open problem.

Lastly, there is no means in an identity to express variables within a cryptosystem. There can be no negotiation about acceptable block ciphers, data compression, data MACing, both start and stop date of a given key, and so on. An IBE system cannot help but be a one-size-fits-all system for these parameters. This may not be bad, it may actually be a simplifying assumption. However, expressing these concepts are part of why we have certificates despite the problems in managing them.

There are two possible approaches to dealing with this paradox—one being to make an IBE system that codes a more formal certificate and then uses that as an IBE key or this approach which adapts IBE so that it can be used within a traditional certificate system.

Another issue to address is whether it is possible to prove ownership of a string. When one describes how IBE works, at the Key Extraction phase one summarily says that Alice authenticates herself to the PKG to get her private key. How is this done?

If Alice is already an authenticated user of the PKG, this isn't very difficult. If it is to hotmail.com that Alice must prove ownership of alice@hotmail.com, this is an easy problem. If worst comes to worst, she has a password she can type in. If it is to brand-new-service.com that Alice must prove ownership of alice@hotmail.com, it is a bit more difficult, but hardly impossible. A simple, if low-security mechanism is for brand-new-service.com to send her an email with some authentication token that she delivers back to brand-new-service.com. For those who believe that this is insufficiently secure, there are other protocols that are easy to devise that are more secure. For example, Alice could generate an ephemeral RSA key pair, give brand-new-service.com the public key, and then deliver to brand-new-service.com the decrypted authentication token as before.

However, if Alice must prove the ownership of "Alice Jones", then we have a very difficult problem. Names are hard to express in a certificate system, and among the many criticisms of certificate systems the most basic objections concern the way they handle naming. If a name is a key, then a certificate is a key, and all the naming problems we have in certificates we have in names. Making names be keys exacerbates this problem. If the IBE system uses other bit strings such as photographs, music, etc. as keys, proof of ownership could be arbitrarily hard, both technically and legally.

IBE systems in general suffer from centralization on many fronts. Not only does centralization create security issues, but it also creates performance issues. The PKG may have to do large amounts of work, especially when the system uses many short-lived keys. In this system, the need for the PKG to generate keys creates more work. Furthermore, generating a key for some cryptosystems such as RSA require more computation than for others, such as DSA.

One possible solution to this problem is HIBE. HIBE expresses the user's identity as a composite of identities. For example, Alice's identity would be the tuple ($ID_{Alice}$, $ID_{hot-mailcom}$) [GS02] [HL02]. While attractive from a performance viewpoint, it also blurs the conceptual simplicity of a name being a key. It also requires that the identities themselves have some structure in them that can form a hierarchy. HIBE also provides a partial solution to the escrow problem as no single server has the key for any hierarchical identity; an adversary must compromise more than one part of the hierarchy.

Additionally, systems that secret-split in a set of authorities could potentially also use this as a way to distribute the computational workload of IBE over the set. Nonetheless, performance is another consideration that IBE systems must take into account, and this one more than most, since there is no off-line generation of keys.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable medium storing executable code to generate an identity-based encryption key, wherein said executable code comprises executable code to:
   specify a master key;
   receive an identity-based string;
   execute a function that processes said master key and said identity-based string to produce a seed;
   use said seed to produce an identity-based encryption key pair interoperable with a conventional public key cryptosystem;
   deliver said identity-based encryption key as a public key in response to an unauthenticated request; and
   respond to an authenticated request by delivering said identity-based encryption key and a private key.

2. The computer readable medium of claim 1 wherein said executable code to specify said master key includes executable code to specify said master key from a trusted central authority within a networked environment.

3. The computer readable medium of claim 1 wherein said executable code to receive said identity-based string includes executable code to normalize said identity-based string from a plurality of alias identities.

4. The computer readable medium of claim 1 wherein said executable code to receive said identity-based string includes executable code to receive said identity-based string with a temporal component.

5. The computer readable medium of claim 1 wherein said executable code to respond to said authenticated request includes executable code to deliver said identity-based encryption key and said private key via a secure network connection.

6. A computer readable medium storing executable code to generate an identity-based encryption key, wherein said executable code comprises executable code to:
   produce an identity digest token that is a function of a master key and an identity-based string;
   seed a random number generator with said identity digest token to produce an identity-based encryption key pair interoperable with a conventional public key cryptosystem;
   deliver said identity-based encryption key as a public key in response to an unauthenticated request; and
   respond to an authenticated request by delivering said identity-based encryption key and a private key.

7. The computer readable medium of claim 6 wherein said executable code includes executable code to specify a master key from a trusted central authority within a networked environment.

8. The computer readable medium of claim 6 wherein said executable code includes executable code to normalize said identity-based string from a plurality of alias identities.

9. The computer readable medium of claim 6 wherein said executable code includes executable code to receive said identity-based string with a temporal component.

10. The computer readable medium of claim 6 wherein said executable code to respond to said authenticated request includes executable code to deliver said identity-based encryption key and said private key via a secure network connection.

* * * * *